(12) United States Patent
Wübbels et al.

(10) Patent No.: US 6,658,832 B2
(45) Date of Patent: Dec. 9, 2003

(54) CROP DEFLECTOR FOR MACHINE FOR MOWING STALK-LIKE CROPS

(75) Inventors: Richard Wübbels, Rhede (DE); Norbert Wolters, Gescher (DE)

(73) Assignee: Maschinenfabrik Kemper GmbH & Company KG, Stadtlohn (DE)

( * ) Notice: Subject to any disclaimer, the term of this patent is extended or adjusted under 35 U.S.C. 154(b) by 0 days.

(21) Appl. No.: 10/079,152

(22) Filed: Feb. 20, 2002

(65) Prior Publication Data

US 2002/0134064 A1 Sep. 26, 2002

(30) Foreign Application Priority Data

Feb. 22, 2001 (DE) ............................. 101 08 516

(51) Int. Cl.[7] .............................................. A01D 45/02
(52) U.S. Cl. .................................... 56/94; 56/119
(58) Field of Search ......................... 56/94, 60, 119, 56/503, 53, 500, 153, 84, 16.4 B, 400.2

(56) References Cited

U.S. PATENT DOCUMENTS

| | | | | |
|---|---|---|---|---|
| 3,462,927 A | * | 8/1969 | Quick | 56/56 |
| 3,742,687 A | * | 7/1973 | Kalkwaf | 56/119 |
| 4,021,997 A | * | 5/1977 | Tanaka | 56/56 |
| 4,926,623 A | | 5/1990 | Fiener | 56/60 |
| 5,157,904 A | * | 10/1992 | Otten et al. | 56/2 |
| 5,237,804 A | * | 8/1993 | Bertling | 56/60 |
| 5,722,225 A | | 3/1998 | Wuebbels et al. | 56/60 |
| 5,852,922 A | * | 12/1998 | Over Behrens et al. | 56/14.7 |
| 6,062,011 A | * | 5/2000 | Uhlending et al. | 56/119 |
| 6,298,643 B1 | * | 10/2001 | Wuebbels et al. | 56/60 |

FOREIGN PATENT DOCUMENTS

EP  0 818 136 A1  1/1998

* cited by examiner

Primary Examiner—Robert E. Pezzuto
Assistant Examiner—Árpád Fábián Kovács

(57) ABSTRACT

The invention pertains to a machine including several transversely spaced feed and mowing devices for mowing stalk-type crops. A transverse conveyor channel, through which the harvested crop can be conveyed at least approximately transverse to the forward driving direction, is provided on the rear side of the aforementioned feed and mowing devices, and a feed channel, through which the harvested crop can be fed to a chopping device, is arranged on the downstream end of the transverse conveyor channel. Provided and an intersection of the transverse conveyor channel and the feed channel is a deflector element that is mounted for deflecting downwardly and/or rearwardly plants that protrude out of the transverse conveyor channel such as to prevent them from becoming jammed in front of the feed channel.

11 Claims, 2 Drawing Sheets

CROP DEFLECTOR FOR MACHINE FOR MOWING STALK-LIKE CROPS

FIELD OF THE INVENTION

The invention pertains to a machine for mowing stalk-type crops and which contains several feed and mowing devices that are arranged laterally adjacent to one another and serve for cutting off and transporting the crop being harvested, wherein a transverse conveyor channel, through which the harvested crop can be conveyed at least approximately transverse to the forward driving direction, is provided on the rear side of the aforementioned feed and mowing devices, and wherein a feed channel, through which the harvested crop can be fed to a chopping device, is arranged on the downstream end of the transverse conveyor channel.

BACKGROUND OF THE INVENTION

In known machines for mowing stalk-type crops, see U.S. Pat. No. 5,722,225, for example, several mowing and feed drums are arranged laterally adjacent to one another, with the crop being harvested by the outer mowing and feed drums being initially laterally transported along the rear side of the machine in a transverse conveyor channel and then introduced into a feed channel by means of slope conveyor drums that rotate about approximately vertical shafts, i.e., the harvested crop is deflected rearward opposite to the driving direction by 90°. The harvested crop is fed to the pre-compressing rollers and the chopping drum of a field chopper through the feed channel.

U.S. Pat. No. 4,926,623 also discloses a mowing device in which the crop to be harvested is mowed and then transported transverse to the driving direction. Stripping rollers that rotate about vertical shafts transport the harvested crop to the feed rollers in the feed channel of the field chopper.

EP 0 818 136 A1 discloses a front attachment for a field chopper in which a driven conveyor roller is mounted for rotating about a horizontal shaft arranged upstream of the feed rollers in the feed channel of a field chopper. The conveyor roller lifts the stalks of the harvested crop upward and then transports the stalks into the feed channel. The conveyor roller only conveys the harvested crop to the rear along the path of forward movement of the field chopper in this case.

In machines for mowing stalk-type crops in which the harvested crop is transported in a transverse conveyor channel, it occasionally occurs that the lower ends of the harvested plants, for example, long green corn stalks, protrude out of the transverse conveyor channel. Slope conveyor drums that rotate about approximately vertical shafts are arranged laterally upstream of the fore-and-aft disposed feed channel leading to the pre-compressing rollers. The function of these slope conveyor drums consists of conveying the plants rearward, namely into the feed channel. However, the slope conveyor drums are unable to take hold of the plants that protrude out of the transverse conveyor channel with their lower ends. These plants may become situated laterally in front of the slope conveyor drums such that they block the additional crop flow. Although this jamming effect could be improved by narrowing the transverse conveyor channel, throughput problems almost certainly would arise in the normal harvesting mode, i.e., when plants are drawn in over the entire width of the machine.

SUMMARY OF THE INVENTION

According to the present invention, there is provided an improved crop feeding arrangement for a mowing machine having laterally spaced mowing and feed drums having a transverse conveyor channel behind them.

An object of the invention is to provide a mowing machine, as described above, wherein a deflection element is arranged at a height above the transverse conveyor channel in a location just upstream of the feed channel that extends rearwardly from an inner end of the transverse conveyor channel.

A more specific object of the invention is to provide mowing machine, as set forth in the immediately preceding object wherein the deflection element is mounted and shaped for deflecting plant parts, that protrude upward out of the transverse conveyor channel, downward and/or rearward opposite to the forward driving direction. In order to act upon plants that upwardly protrude out of the transverse conveyor channel with a downwardly directed force, the lower surface of the deflection element is disposed at an incline with respect to vertical and horizontal lines. Thus, when viewing the deflection element from the rear while facing in the forward driving direction, a wedge or an inclined plane is formed on which plants that protrude upwardly out of the transverse conveyor channel impinge and are deflected downward.

Another object of the invention is to provide a deflection element, as set forth in the objects above, which is mounted for rotation about a horizontal transverse axis and is shaped so that it rotates freely so as to prevent undesirable friction between the harvested crop and the deflection element while maintaining a constant deflection surface profile for deflecting upwardly projecting stalks.

Yet another object of the invention is to provide a deflection element, as set forth in the foregoing objects, which is mounted for moving upward against a yieldable biasing force. Due to this measure, the deflection element interacts with the crop flow independently of its flow density. In addition, the harvested crop is compressed such that the conveying process is simplified. It would also be conceivable to provide a lower and/or upper limit stop for defining the range of motion of the deflection element.

These and other objects will become apparent from a reading of the ensuing description together with the appended drawings.

DESCRIPTION OF THE PREFERRED EMBODIMENT

Figure 1:
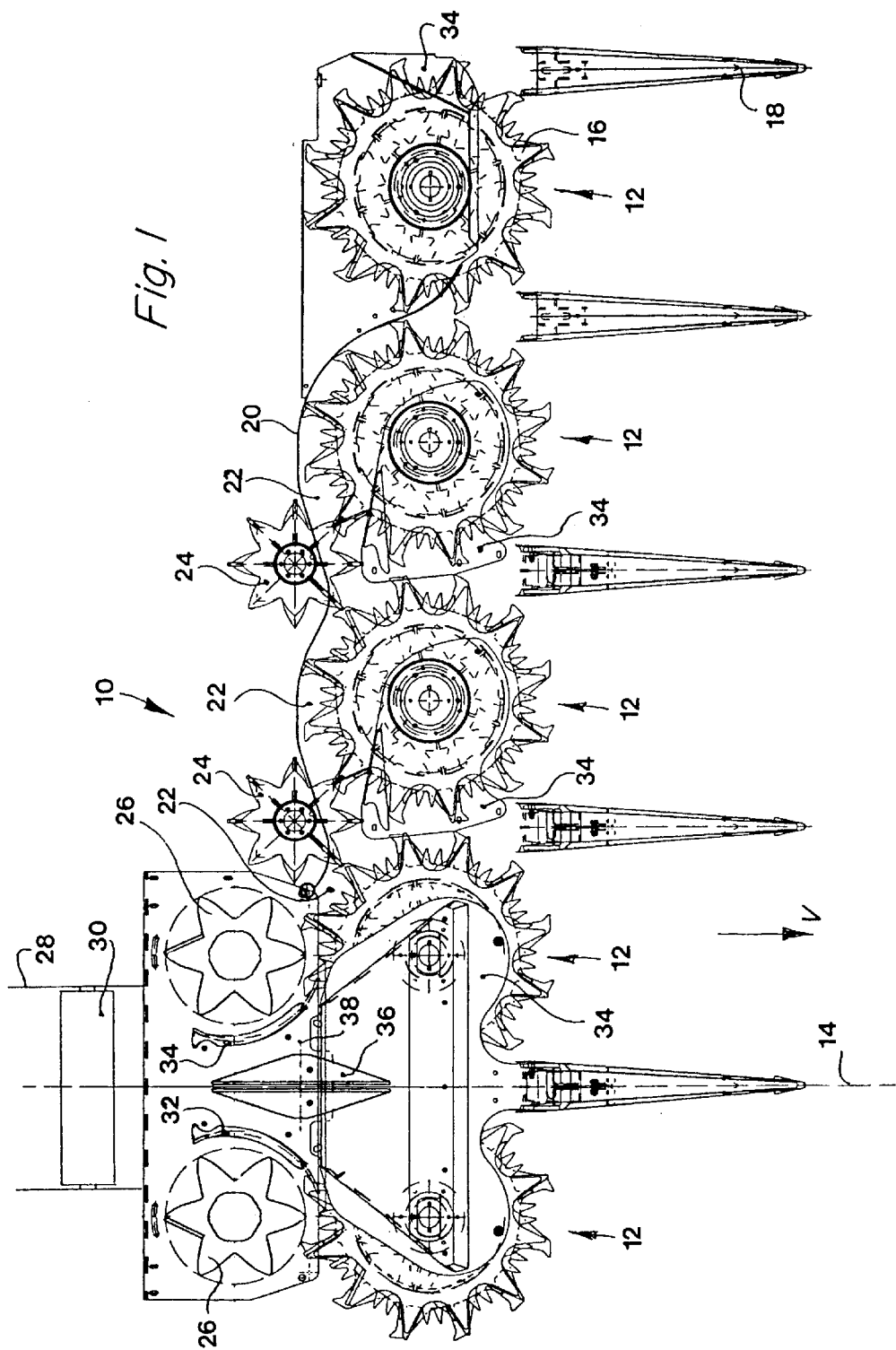
FIG. 1 is a somewhat schematic top view of a machine for mowing stalk-type crops embodying the crop deflector of the present invention.

Referring now to FIG. 1, there is shown a machine 10 which serves for mowing stalk-type crops. The machine 10 includes a series of feed and mowing devices 12 that are arranged symmetrically about a central longitudinal plane 14 of the machine 10. Although an identical number of feed and mowing devices 12 is arranged on both sides of the central longitudinal plane 14, only one feed and mowing device 12 is shown to the left of the central longitudinal plane 14 in order to provide a better overview. The feed and mowing devices 12 each include a lower cutting wheel (not shown) that rotates about a vertical axis and conveyor wheels 16 arranged coaxially on top thereof, wherein the circumference of the conveyor wheels is provided with pocket-shaped recesses. Stalk dividers 18 are arranged in front of the feed and mowing devices 12. A transverse conveyor channel 22, through which the crop being harvested by the feed and mowing devices 12 is laterally conveyed to the center of the machine 10, is formed between the rear side of the feed and mowing devices 12 and a rear wall 20 of the machine 10. The lateral transport of crop in the transverse conveyor channel is aided by conveyor wheels 24 that are rotated about vertical shafts and include driving elements that extend through slots in the rear wall 20. Viewed in the forward driving direction V, slope conveyor drums 26 with forwardly inclined axes of rotation are arranged behind the two central feed and mowing devices 12. These slope conveyor drums convey the harvested crop rearward from the transverse conveyor channel 22, namely into the feed channel 28 of a field chopper in which feed rollers 30 are arranged, one above the other. The rearward deflection of the harvested crop is simplified by arc-shaped deflection skids 32 that are arranged on the bottom of the machine 10 between the slope conveyor drums 26. The front ends of the deflection skids 32 also act as devices for clearing out or stripping crop from the recesses of the central feed and mowing devices 12. The feed and mowing devices 12 are provided with flat top shields or covers 34.

While harvesting, the machine 10 is mounted on the feed channel 28 of a field chopper and driven over a field in the forward direction V. The stalk-type crop that may be laterally deflected by the stalk dividers 18 is cut off by the feed and mowing devices 12 and transported into the transverse conveyor channel 22. The harvested crop is transported to the rear side of the two central feed and mowing devices 12 where it is deflected rearward by the deflection skids 32 due to the conveying effect of the rear sides of the ensuing downstream feed and mowing devices 12 and the conveyor wheels 24. The slope conveyor drums 26 transport the harvested crop to the feed rollers 30 of the field chopper that chops and then deposits the crop on a vehicle.

When harvesting problematic crops, for example, long green corn plants, the bottom ends of the plants may protrude out of the transverse conveyor channel 22 and then shoot past the slope conveyor drums 26 in the center. This causes the machine 10 to become jammed such that the operator has to exit the cabin of the field chopper and manually remedy the problem. This causes much lost time.

This problem is solved by arranging a deflection element 36 upstream of the feed channel 28 viewed in the forward driving direction V and above the transverse conveyor channel 22 of the machine 10, wherein said deflection element comprises two conical rollers, each of which is triangular in horizontal cross section and are arranged in a laterally reversed fashion about the central longitudinal plane 14 and supported to allow for free rotation (i.e., without a drive) about a horizontal shaft 38 that extends transverse to the forward driving direction V. Thus, the two rollers are in the form of a pair of three-sided pyramids lying on their sides with their bases next to each other.

A single roller could be used instead of the pair shown, in which case the single roller would have four sides and would be rectangular or rhombic in cross section. Further, instead of the surfaces of the deflection elements 36 being flat in profile, they may be convex or concave.

In any event, the surfaces of the rollers forming the deflection elements 36 are arranged such that the bottom ends of the plants that protrude out of the transverse conveyor channel 22 come in contact with the roller surfaces behind the shaft 38. Since the deflection element surfaces are downwardly and rearwardly inclined at these locations, the plants are deflected downward and rearward to the respectively adjacent slope conveyor drum 26. This means that the plants are clamped between the deflection element 36 and the slope conveyor drums 26 and transported into the feed channel 28.

Figure 2:
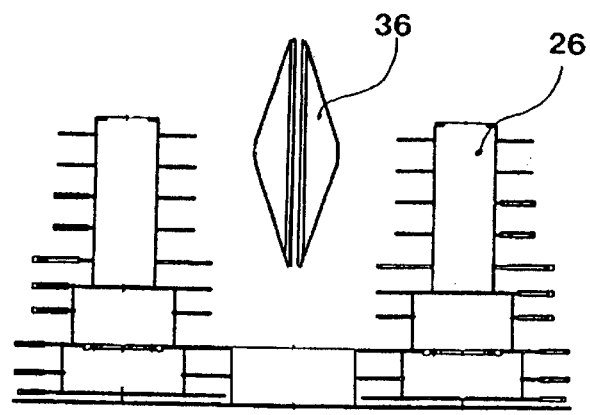
FIG. 2 is a schematic partial front view of the machine.

Referring now to FIG. 2, the arrangement of the deflection element 36 relative to the slope conveyor drums 26 is shown in front view. There it can be seen that any plants that protrude out of the transverse conveyor channel 22 will be rearwardly and downwardly deflected by the respective lower rear surfaces of the deflection element 36.

Figure 3:
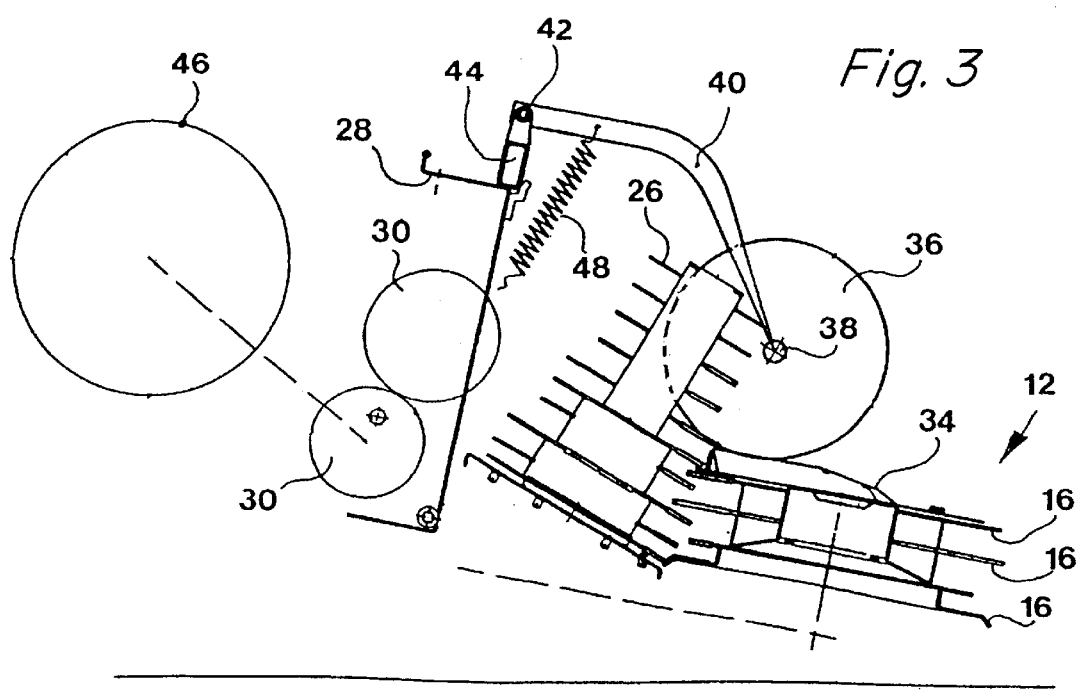
FIG. 3 is a schematic right side view of the machine.

Referring to FIG. 3, there is shown the suspension of the deflection element 36. Specifically, the shaft 38 is supported on an arm 40 that is supported in a pivoted fashion with its rear end on a frame element 44 of the machine 10 by means of a horizontal shaft 42 that is directed transverse to the forward driving direction V. The frame element 44 is supported on the feed channel 28 in which the feed rolls 30 are mounted for delivering crop rearwardly to a chopping drum 46 of the field chopper. The arm 40 extends forwardly and then downwardly from the shaft 42 and is loaded downwardly by a coil spring 48 that is coupled to the machine 10. Consequently, the coil spring 48 yieldably restrains the deflection element 36 in a lower extreme position adjacent the cover or shield 34. In the idle position, i.e., when no plants are drawn in, the deflection element 36 actually rests on the cover 34 of the central feed and mowing devices 12. However, as soon as the crop being harvested arrives in the transverse conveyor channel 22 from one or both sides, the deflection element 36 is pressed upward against the force generated by the coil spring 48 and causes the harvested crop passing beneath it and between the two slope conveyor drums 26 to be compressed. The deflection element 36 freely rotates with the harvested crop being conveyed, wherein no additional friction is generated.

This results in the crop transport of the machine 10 according to the invention to be significantly improved. The plants are clamped between the deflection element 36 and the slope conveyor drums 26 and reliably transported into the feed channel 28 by the latter.

Having described the preferred embodiment, it will become apparent that various modifications can be made without departing from the scope of the invention as defined in the accompanying claims.

What is claimed is:

1. In a machine for moving fore-and-aft in a direction of travel and mowing stalk-type crops including a plurality of feed and mowing devices arranged laterally adjacent to one another and acting for cutting off and transporting the crop being harvested, said machine further including a transverse conveyor channel located behind said feed and mowing devices for conveying the crop transversely inwardly to a location forward of a fore-and-aft extending feed channel leading rearwardly to a chopping device, the improvement comprising: a deflection element arranged forwardly of said feed channel and having a working position at a height commensurate with respective tops of said feed and mowing devices such that said height is immediately above said transverse conveyor channel; said deflection element having a surface facing transversely, relative to said direction of travel and inclined for deflecting plants, that protrude upwardly out of the transverse conveyor channel, at least one of downward and rearward.

2. The machine according to claim 1, wherein said deflection element has a lower surface that diverges upwardly from, and forms an acute angle with, a vertical plane extending in said direction of travel.

3. The machine according to claim 1, wherein said deflection element has a rear surface that diverges transversely forwardly from, and forms an acute angle with a vertical plane extending in said direction of travel.

4. The machine according to claim 1, wherein said deflection element is mounted for rotation.

5. The machine according to claim 4, wherein said deflection element is freely rotatable.

6. The machine according to claim 4, wherein said deflection element has a horizontal shaft that extends transverse to said direction of travel.

7. The machine according to claim 6, wherein said horizontal shaft of said deflection element is arranged in front of said transverse conveyor channel.

8. The machine according to claim 1, wherein said deflection element has at least three sides as viewed in vertical cross section.

9. The machine according to claim 1, wherein said deflector element is mounted for vertical movement; and a biasing element yieldably urging said deflection element to a lower extreme position.

10. The machine according to claim 1, and further including two slope conveyor drums mounted for rotation about approximately vertical shafts located forward of, and adjacent opposite sides of said the feed channel; and at least part of said deflection element being located between said slope conveyor drums.

11. The machine according to claim 1 wherein said deflection element is comprised of two identical pyramid-like bodies having adjacent, opposed bases and each body having at least three sides which converge outwardly from a respective base.

* * * * *